United States Patent
Crawford et al.

(10) Patent No.: US 9,423,973 B2
(45) Date of Patent: Aug. 23, 2016

(54) ASYNCHRONOUS TAPE BACKUP AND RESTORE FROM TAPE BACKUP IN A DISK STORAGE ENVIRONMENT

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/547,338

(22) Filed: Nov. 19, 2014

(65) Prior Publication Data

US 2016/0139839 A1    May 19, 2016

(51) Int. Cl.
G06F 12/16        (2006.01)
G06F 3/06         (2006.01)

(52) U.S. Cl.
CPC .............. G06F 3/0619 (2013.01); G06F 3/065 (2013.01); G06F 3/0682 (2013.01)

(58) Field of Classification Search
CPC ...... G06F 3/0619; G06F 3/065; G06F 3/0682
See application file for complete search history.

(56) References Cited

U.S. PATENT DOCUMENTS

| | | | |
|---|---|---|---|
| 7,266,574 B1 | 9/2007 | Boudrie et al. | |
| 7,761,426 B2 | 7/2010 | Boyd et al. | |
| 7,802,126 B2 | 9/2010 | Johnson | |
| 8,250,323 B2 | 8/2012 | Benhase et al. | |
| 2005/0108470 A1 | 5/2005 | Gold et al. | |
| 2006/0218434 A1 | 9/2006 | Solhjell | |
| 2007/0130213 A1* | 6/2007 | Jean-Denis | G06F 11/2064 |
| 2008/0059734 A1* | 3/2008 | Mizuno | G06F 11/1469 |
| | | | 711/162 |

FOREIGN PATENT DOCUMENTS

| | | |
|---|---|---|
| CN | 203054824 U | 7/2013 |
| TW | 1266186 B | 11/2006 |

OTHER PUBLICATIONS

Jennas II. et al., "Tape Backup and Restore in a Disk Storage Environment," U.S. Appl. No. 14/463,705, filed Aug. 20, 2014.
Jennas II. et al., "Tape Backup and Restore in a Disk Storage Environment," U.S. Appl. No. 14/541,689, filed Nov. 14, 2014.

* cited by examiner

*Primary Examiner* — John A Lane
(74) *Attorney, Agent, or Firm* — Scott S. Dobson; Jennifer M. Anda

(57) ABSTRACT

A metadata object identifying a set of disk locations which have been written to during a consistency group is maintained. Backup data for the consistency group is written. Writing backup data for the consistency group includes identifying a disk location from the set of disk locations, generating a record containing the disk location, data stored at the disk location, and a consistency group value identifying the consistency group, and writing the record to tape storage. Records written to tape storage can be used to restore data to disk storage for a given consistency group.

20 Claims, 10 Drawing Sheets

700

| Track ID | CG |
|---|---|
| fb_0001 A | 2 |
| fb_0001 E | 5 |
|  |  |
| fb_0001 B | 2 |
| fb_0001 C | 4 |
|  |  |
| fb_0001 D | 6 |
|  |  |

| Track ID | Tape Cartridge | Cartridge Address | CG |
|---|---|---|---|
| fb_0001 A | AAA001 | 0x375 | 3 |
| fb_0001 B | AAA001 | 0x1A6 | 3 |
| fb_0001 C | AAA038 | 0x1A6 | 2 |
| fb_0001 D | AAA001 | 0x51E | 3 |
| fb_0001 E | AAA038 | 0x008 | 1 |
| ... | ... | ... | |

FIG. 9

ASYNCHRONOUS TAPE BACKUP AND RESTORE FROM TAPE BACKUP IN A DISK STORAGE ENVIRONMENT

BACKGROUND

The present disclosure relates to computer backup storage, and more specifically, to log-structured tape backup and restore in a disk storage environment.

Tape storage is sometimes used to back up data from disk storage. Tape storage provides backup storage at a low energy cost and allows data to survive for a long period of time in an encrypted format. Users backing up disk storage to tape storage typically build a custom-offload solution that involves creating a point in time copy of the volumes to be backed up, then, using a tape manager and/or host application, copying the data from the point in time copy to the tape. This is normally done at night, and care must be taken to ensure off-load is done within a certain period of time.

SUMMARY

According to embodiments of the present disclosure, a method for asynchronous tape backup in a disk storage environment is disclosed. The method includes maintaining a metadata object identifying a set of disk locations which have been written to during a consistency group. The method further includes writing backup data for the consistency group. Writing backup data for the first consistency group include identifying a disk location from the set of disk locations, generating a record containing the disk location, data stored at the disk location, and a consistency group value identifying the consistency group, and writing the record to tape storage.

Further disclosed herein are embodiments of method for restoring data to disk storage from tape backup. The method includes scanning a set of tape cartridges which contain records. Each record includes a disk location, a consistency group value, and backup data. The records include a first record at a first record location. The first record is associated with a first disk location and a first consistency group value. The method further includes generating a record location table for each consistency group value. The method further includes populating a first entry for the first record in a first record location table. The first record location table is associated with the first consistency group value. The first entry includes the first disk location, the first record location, and the first consistency group value.

Further disclosed herein are embodiments of a system for tape backup in a disk storage environment. The system includes a tape backup system containing a set of tape cartridges and a disk storage system connected to the tape backup system. The disk storage system is configured to maintain a first metadata object identifying a set of disk locations which have been written to during a consistency group and write backup data for the consistency group. Writing backup data for the first consistency group includes identifying a disk location from the set of disk locations, generating a record containing the disk location, data stored at the disk location, and a consistency group value identifying the consistency group, and writing the record to tape storage.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example cartridge record table with record information for specific record locations in a tape cartridge.

FIG. 9 depicts an example record location table created during the restore process.

Figure 1:
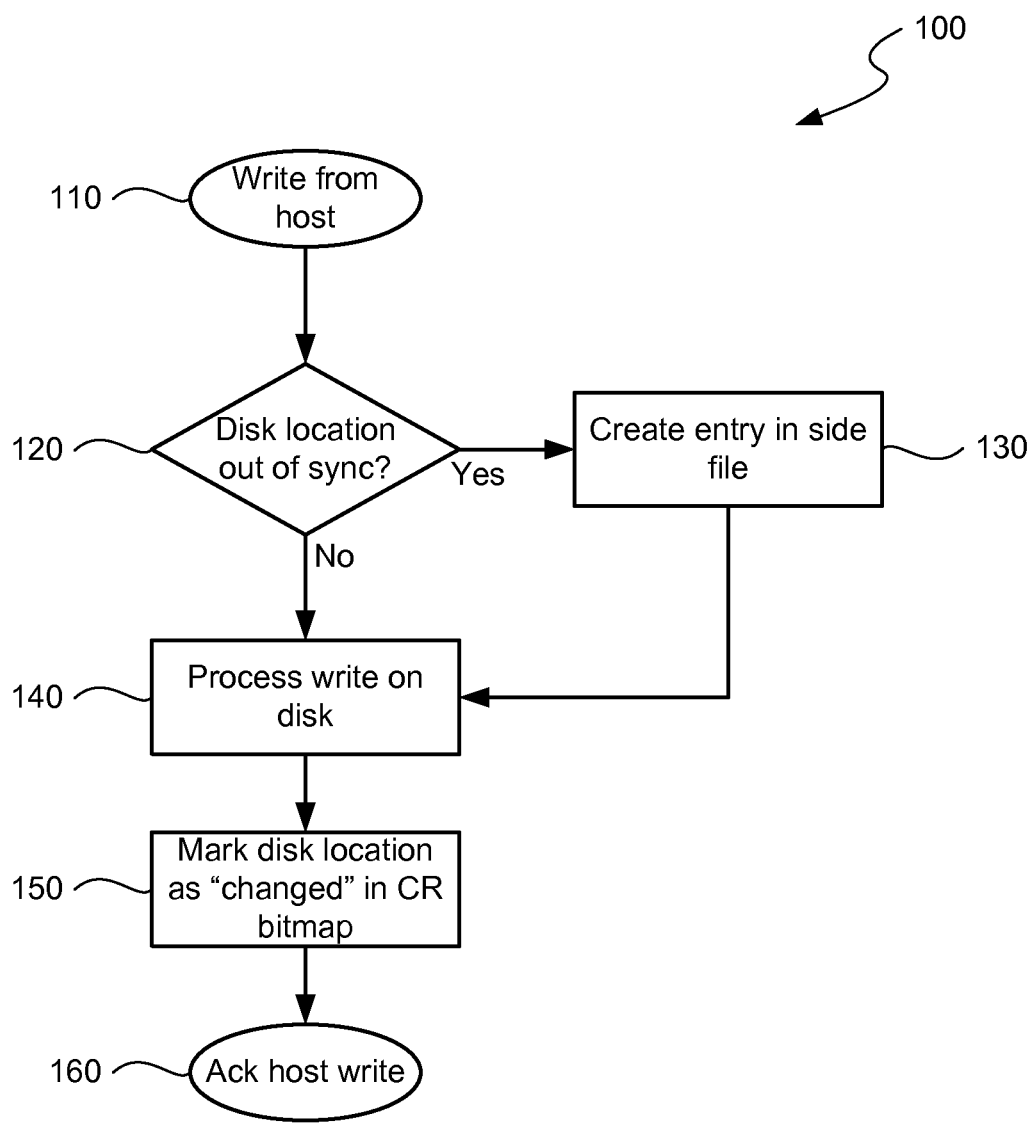
FIG. 1 depicts an example method for tracking writes to specific disk locations.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to asynchronous log-structured tape backup and restore in a disk storage environment. Further aspects relate to restoring data from tape backup based on consistency groups. While the present disclosure is not necessarily limited to such applications, various aspects of the disclosure may be appreciated through a discussion of various examples using this context.

Embodiments of the present disclosure may provide automatic consistent restore points on tape backup using a log-structured tape backup algorithm. Further embodiments of the present disclosure may provide for restoring data, from a set of selectable restore points, to the disk storage system.

The disk storage system tracks the locations of writes since the last consistency group. A consistency group (CG) is a consistent set of data at a point in time. When the disk storage system creates a restore point for the CG, the disk storage system creates a record for each of the locations which were written to and writes the records to tape storage. The records contain the disk location, the CG value, and the backup data. The disk location and CG value may be located in a header of the record to simplify identification during the restore process. While the disk storage system is generating records and writing the records to tape storage, the disk storage system may continue to track the location of writes for the next CG. For a given CG, records are written for locations which have been written to. Thus, the complete set of data for a given CG may include records written for previous CGs associated with disk locations which have not been written to since the writing of the record.

The records may further contain an invalid CG indicator which may be used during the restore process. When a CG becomes invalid, this field may be populated with the CG value of the invalid CG. During restore the CG value may indicate that the CG associated with the CG value and any earlier CGs are invalid. Further, the records may contain a timestamp which indicates the time at which the restore point was created. In some embodiments, the last record written to tape for a given CG will contain the timestamp for the CG to indicate that the CG is complete. The timestamp may be used during restore to provide a user with a time associated with the restore point.

To restore data from tape storage, the tape cartridges containing records are scanned through and the disk location and CG are read off of each record. Tables may be created for each CG. The CGs which are available to be restored may be provided to a user and the user may select one of the CGs. The table associated with the selected CG may be used to identify record locations to restore data to disk storage.

The tape storage system maintains several metadata objects. First, the disk storage system maintains a change recording object which tracks disk locations which have received writes during the current CG. Further, the disk storage system may maintain an out of sync object which tracks the disk locations which are out of sync during the backup of a CG. When the process of creating the CG restore point begins, the change recording object may be copied to the out of sync object. As each record is written, the out of sync object may be modified to indicate that the associated disk location is "in sync." Once all the disk locations are "in sync" the creation of the restore point for the CG is complete. Additionally, the metadata may include a cartridge record table for each tape cartridge with information on the current records stored on the respective tape cartridge. After writing a record to tape storage, the disk storage system may store information on the record in the record metadata for the record location. Additionally, the disk storage system may identify an invalid CG and clear entries in the cartridge record tables associated with the CG which are no longer needed. Clearing the information may indicate that the previous record location is free to be written to.

After writing the record to tape storage, the tape cartridge may be positioned at the next free record location. The next free record location may be determined by referencing the metadata, such as a cartridge record table. If the tape cartridge is full, a different tape cartridge may be automatically loaded into the tape drive and may be positioned at the next free record location. The record metadata may be referenced to identify a tape cartridge with the most free record locations in determining which tape cartridge to load into the tape drive.

Referring to FIG. 1, an example method 100 for tracking writes to specific disk locations is depicted. At block 110, a disk storage system receives a write command from a host to write data to a disk location. At block 120, it is determined whether the disk location is out of sync (i.e. the location contains data which is needed to write to a record for the previous consistency group). This may be determined by referencing an out of sync data object. If the disk location is out of sync, an entry for the location containing the current data at the disk location is copied to a side file, at block 130, before proceeding to block 140. At block 140, the data from the write command is written to the disk location in the disk storage. At block 150, a change recording bitmap is modified to indicate the disk location has changed from the previous CG. The bitmap may contain an entry for each disk location in the disk storage system. For example, each entry may have a value of 1 for "changed" or 0 for "not changed." In some embodiments, a different metadata object may be used to track changes to the disk locations. At block 160, the disk storage system acknowledges the write to the host.

Figure 2:
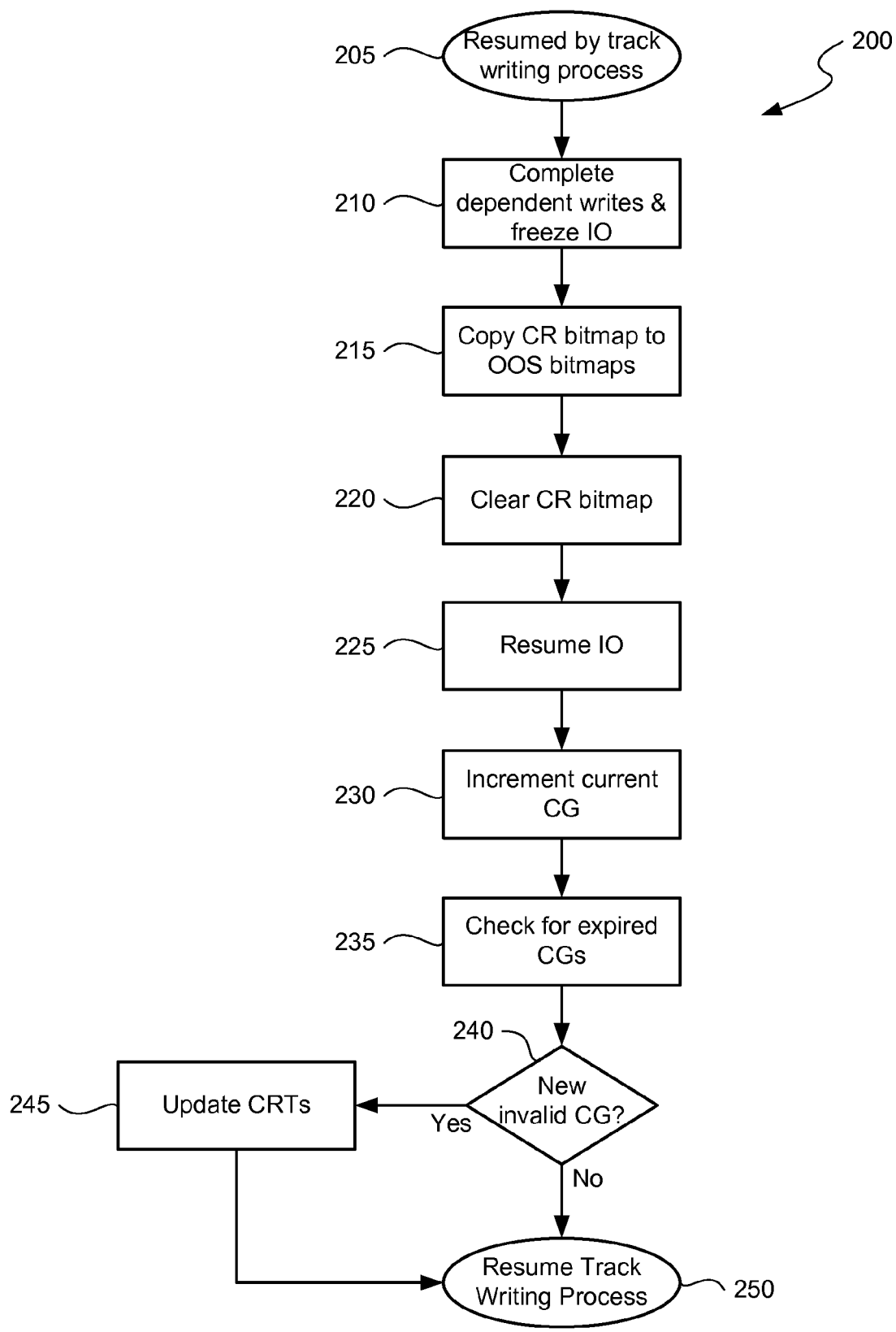
FIG. 2 depicts an example method for maintaining consistency groups.

Referring to FIG. 2, an example method 200 for maintaining CGs is depicted. Method 200 starts at block 205. As depicted, method 200 may be initiated by the completion of the track writing process depicted in FIG. 3 and described herein. In some embodiments, method 200 may be initiated by another method such as a timer.

At block 210, dependent writes are completed and the IO is frozen. The dependent writes are completed first to obtain a CG with a consistent set of data. At block 215, the CR bitmap is copied to the OOS bitmap. At block 220, the CR bitmap is cleared. Copying the CR bitmap to the OOS bitmap and clearing the CR bitmap may be done logically in one step. For example, the pointers may simply be switched between the CR bitmap and the OOS bitmap. This is because the OOS bitmap is clear after completion of the track writing process as described herein with reference to FIG. 3. At block 225, the IO is resumed. At block 230, a metadata object containing the current CG is incremented.

At block 235, the disk storage system checks for expired CGs and updates an invalid CG tracker if there is a new expired CG. A CG may become expired in many different ways depending on the configuration of the system. For example, a CG may become expired after a period of time. Thus, the disk storage system may maintain a metadata object with timestamps for each CG and, at block 235, determine if the difference between the current system time and the timestamp is greater than the period of time the CG is to remain valid. Alternatively, there may be a specified number of CGs which are maintained. Thus, once the specified number is reached, the oldest valid CG becomes invalid for each new CG.

At block 240, it is determined whether there is a new invalid CG. If there is a new invalid CG, method 200 proceeds to block 245 and updates cartridge record tables (CRTs). Updating the CRTs involves clearing all record entries for the invalid CG if it is no longer needed. A record is needed if the record is relied on to complete a valid CG. Records written for prior CGs may be needed because records are created for changes which occur and the data at a certain location may have last changed during an invalid CG. At block 250, the track writing process is resumed which is described in reference to FIG. 3.

Figure 3:
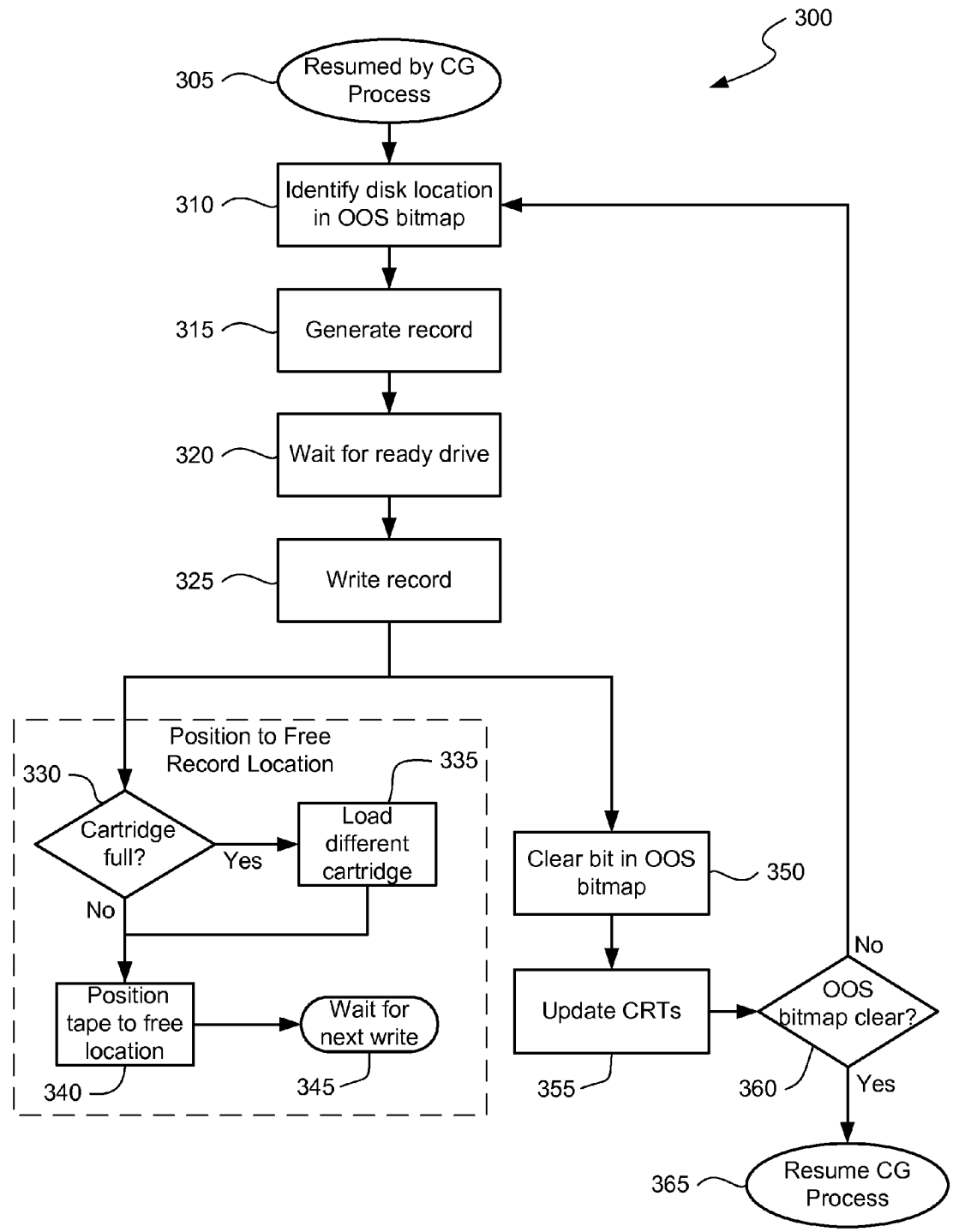
FIG. 3 depicts an example method for writing records to tape storage.

Referring to FIG. 3, an example method 300 for writing records to tape storage is depicted. Method 300 may be resumed at block 305 by the finish of method 200 for maintaining CGs as described above. At block 310 a disk location which is "out of sync" is identified in the OOS bitmap. At block 315, a record is generated for the disk location containing the disk location, the current CG value, and the data at the disk location. In some embodiments, the data may be copied from a side file if the disk location has been written to since the CG was closed. Additionally, the record may contain an invalid CG indicator which is populated with a prior CG value which has become invalid. In some embodiments, this may include the most recent invalid CG value. Further, the record may contain a timestamp associated with the CG. In some embodiments, only the last record for a given CG contains the timestamp. Thus, during the restore process, if no record is identified for a CG with a timestamp, the records for the CG may be incomplete.

At block 320, method 300 may wait for a ready tape drive which is loaded with a tape cartridge and positioned at a free record location. At block 325, the data record may be written to the free record location on the tape cartridge. In response to writing the record, method 300 may proceed to block 330 and block 350.

At block 330, it is determined whether the tape cartridge is full. This may be determined by referencing metadata associated with the tape cartridge, such as a cartridge record table, to determine if there are more free record locations on the cartridge. If the tape cartridge is not full, method 300 proceeds to block 340. If the tape cartridge is full, method 300 proceeds to block 335 and removes the tape cartridge and loads a different cartridge into the tape drive before proceeding to block 340. The cartridge loaded may be the cartridge with the most free record locations as determined through metadata, such as cartridge record tables. At block 340, the loaded tape cartridge is positioned at a free record location. At block 345, the tape drive waits to write the next record.

At block 350, the bit associated with the disk location is cleared in the OOS bitmap. At block 355, the CRT associated with the tape location is updated to reference the record. At block 360, it is determined if the OOS bitmap is clear. If the OOS bitmap is not clear, method 300 returns to block 310 and identifies another disk location in the OOS bitmap. If the OOS bitmap is clear, method 300 proceeds to block 365 and resumes the process of maintaining CGs.

Figure 4:
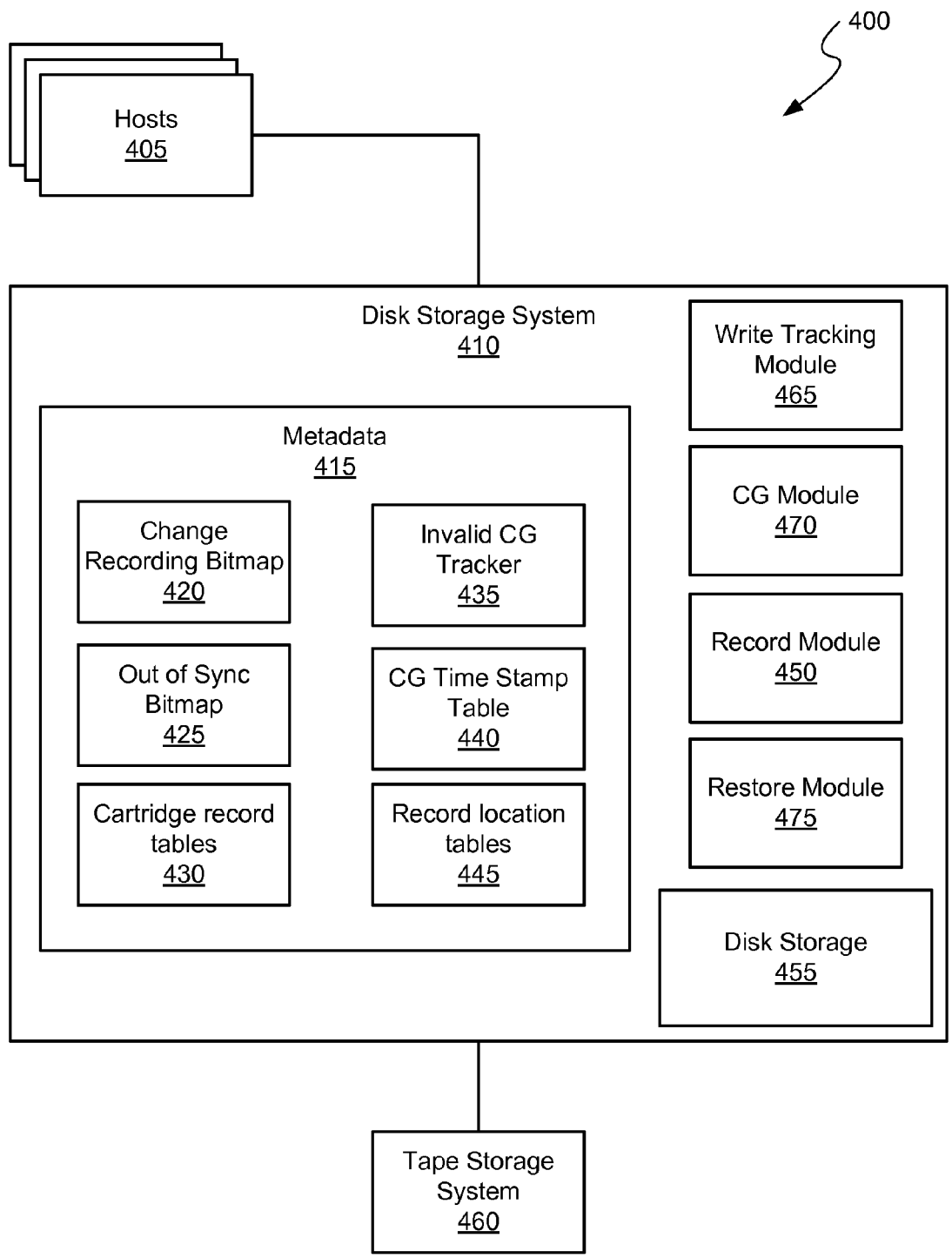
FIG. 4 depicts a block diagram of an example system for asynchronous log-structured tape backup in a disk storage environment.

Referring to FIG. 4, a block diagram of an example system 400 for asynchronous log-structured tape backup in a disk storage environment is depicted. System 400 includes one or more hosts 405, disk storage system 410, and tape library 460. The one or more hosts 405 may send write commands to disk storage system 410. Disk storage system 410 contains disk storage 455 on which the write commands are processed. Disk storage system 410 further contains write tracking module 465, CG module 470, record module 450, restore module 475, and record metadata 415.

Write tracking module 465 may be configured to track writes to disk storage 455 as described in reference to FIG. 1. CG module 470 may be configured to maintain consistency groups as described in reference to FIG. 2. Record module 450 may be configured to write records to tape storage system 460 as described in reference to FIG. 3. Restore module 475 may be configured to restore data from tape storage system 460 to disk storage 455 as described in reference to FIG. 8A and FIG. 8B. Record metadata 415 includes change recording bitmap 420, out of sync bitmap 425, cartridge record table 430, invalid CG tracker 435, and CG time stamp table 440 and record location tables 445.

To initially configure a system 400 as described herein, a user may physically connect I/O ports on tape storage system 460 to the host adaptor I/O ports on disk storage system 410. This may be done through a switch as well. The user may configure the connection statistics for tape storage system 460 so that data communication can occur between disk storage system 410 and tape storage system 460. The user may select tape cartridges that may be used for backup purposes. The user may identify which disk locations on disk storage 455 will be backed up to tape storage system 460. The user may identify a set of tape drives to be used to write to the tape cartridges.

Due to the way in which the record writes are done sequentially to the tape cartridges, the process may proceed faster with a larger capacity in the cartridge pool. Free record locations may be more quickly identified and more quickly available for writing a record when there is larger cartridge capacity. The cartridge capacity may be much greater than the capacity of the disk locations being backed up.

Figure 5:
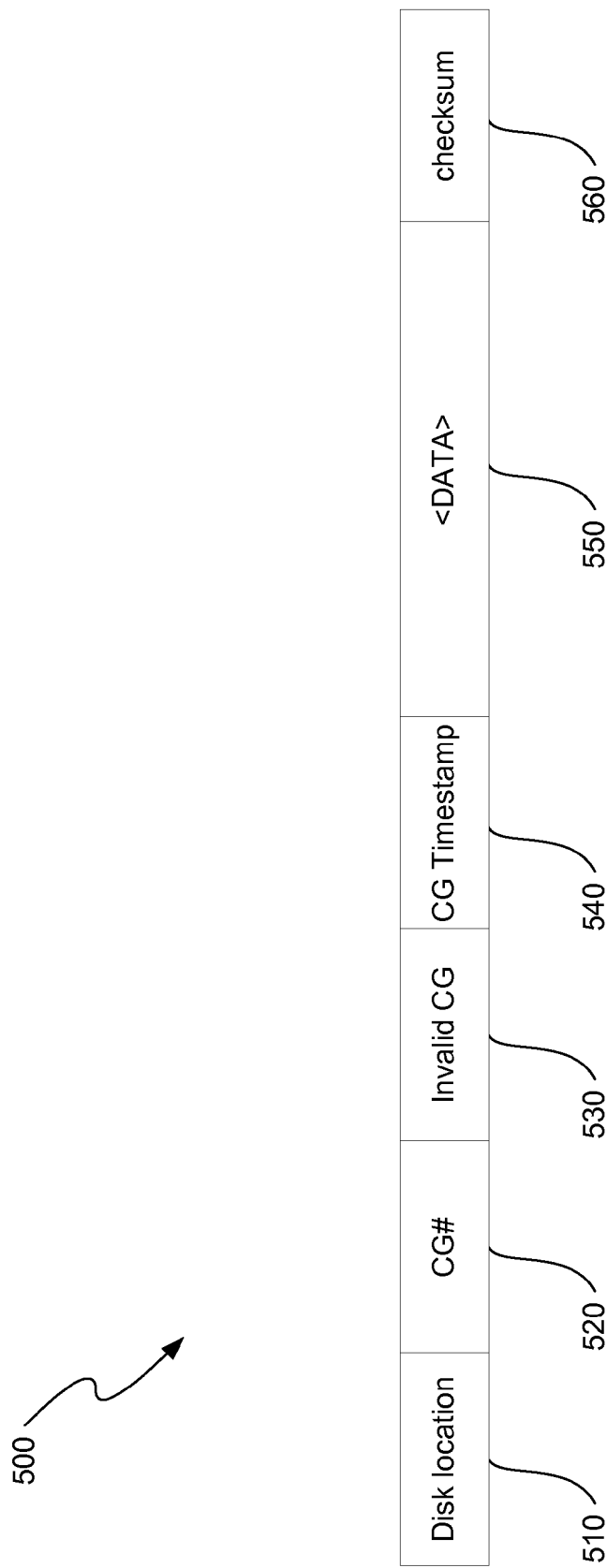
FIG. 5 depicts an example record for writing to tape storage.

Referring to FIG. 5, an example record 500 for writing to tape storage is depicted. Record 500 includes a disk location 510, consistency group 520, invalid CG indicator 530, CG timestamp 540, and data 550. Data record 500 may additionally contain a checksum 560, or other data string, for detecting data corruption. Disk location 510 contains information indicating the disk location of data 550 such as disk volume and location within the volume. Consistency group 520 indicates the CG to which the record belongs. Invalid CG 530 may be populated with an invalid CG value. CG timestamp 540 may be populated with a timestamp associated with the CG. In some embodiments, this field is only populated for the last record in a CG to indicate that the complete CG has been written to tape storage. Disk location 510, consistency group 520, invalid CG 530, and CG timestamp 540 may be located in a header of record 500. Locating the information in a header may allow for a simpler retrieval of information during the disk restore process.

Figure 6:
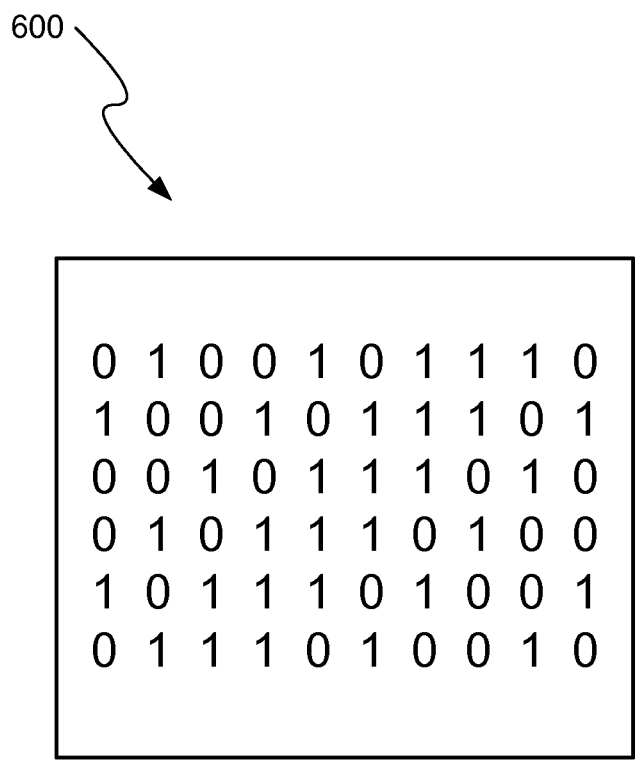
FIG. 6 depicts an example change recording bitmap.

Referring to FIG. 6, an example change recording bitmap 600 is depicted. Each disk location which is being backed up to tape storage may be represented by a 0 or 1 to indicated if there has been a write to the disk location during the current CG. For example, "0" may indicate that there has been no write and "1" may indicate that the location has been written to. At the beginning of a CG the change recording bitmap will indicate that there have been no writes to any of the disk locations for the current CG. As described herein, at the end of a CG the change recording bitmap 600 is copied to the out of sync bitmap. The out of sync bitmap is used to determine which disk locations need records written to tape storage and it may be updated after each record is written to tape storage.

Referring to FIG. 7, an example cartridge record table 700 with record information for specific record locations in a tape cartridge is depicted. Each row in cartridge record table 700 corresponds to a specific record location on the tape cartridge. A row is populated, with the track ID and CG, each time a new record is written to tape with the row corresponding to the location of the record on the tape cartridge. A blank row indicates a record location which is free to be written to. The record location may not contain a record or may contain a record from an invalid CG which may be written over. There may be a separate cartridge record table for each tape cartridge in the tape backup library.

Figure 8A:
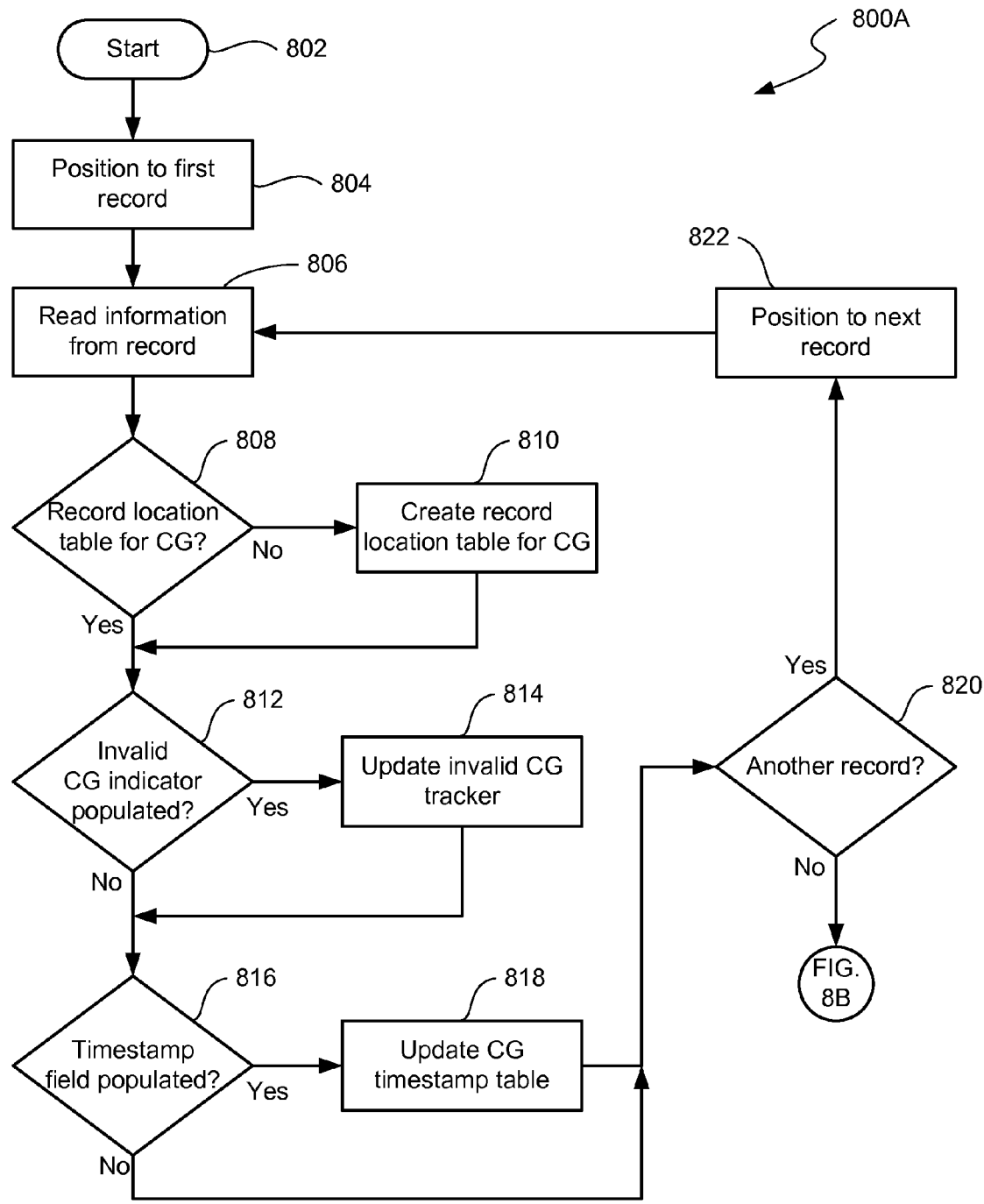
FIG. 8A depicts a first part of an example method for restoring data to disk storage from tape backup.

Referring to FIG. 8A, a first part 800A of an example method for restoring data to disk storage from tape backup is depicted. The method starts at block 802. At block 804, a tape cartridge is positioned to a first record. At block 806, the CG, invalid CG indicator, and timestamp fields are read from the record. This information may be located in a header of the record. At block 808, it is determined if there is a record location table for the CG. If there is not a record location table for the CG, a record location table is created at block 810.

At block 812, it is determined whether the invalid CG field is populated for the record. If there is an invalid CG, the CG tracker is updated, at block 814, to indicate that the CG is invalid. The invalid CG indicator may be a value which indicates the most recent invalid CG, where all the older CGs are also invalid. For example, assuming the CG value increases with each CG, if the invalid CG tracker is at 4 and an invalid CG field is populated with a 6, the invalid CG tracker may be updated to 6. However, if the invalid CG field is populated with a 2, the invalid CG tracker may not be updated as the invalid CG tracker at 4 already indicates that CG 2 is invalid.

At block 816, it is determined if the timestamp field is populated. If the timestamp field is populated, a CG timestamp table is updated to include the timestamp associated with the CG at block 818. At block 820, it is determined if there is another record. If there is another record, at block 822, a tape cartridge is positioned to a next record before returning to block 806. This may include loading a new tape cartridge if the records from the previous tape cartridge have all been read through. If there is not another record to be read at block 820, the method proceeds to block 822 in FIG. 8B.

Figure 8B:
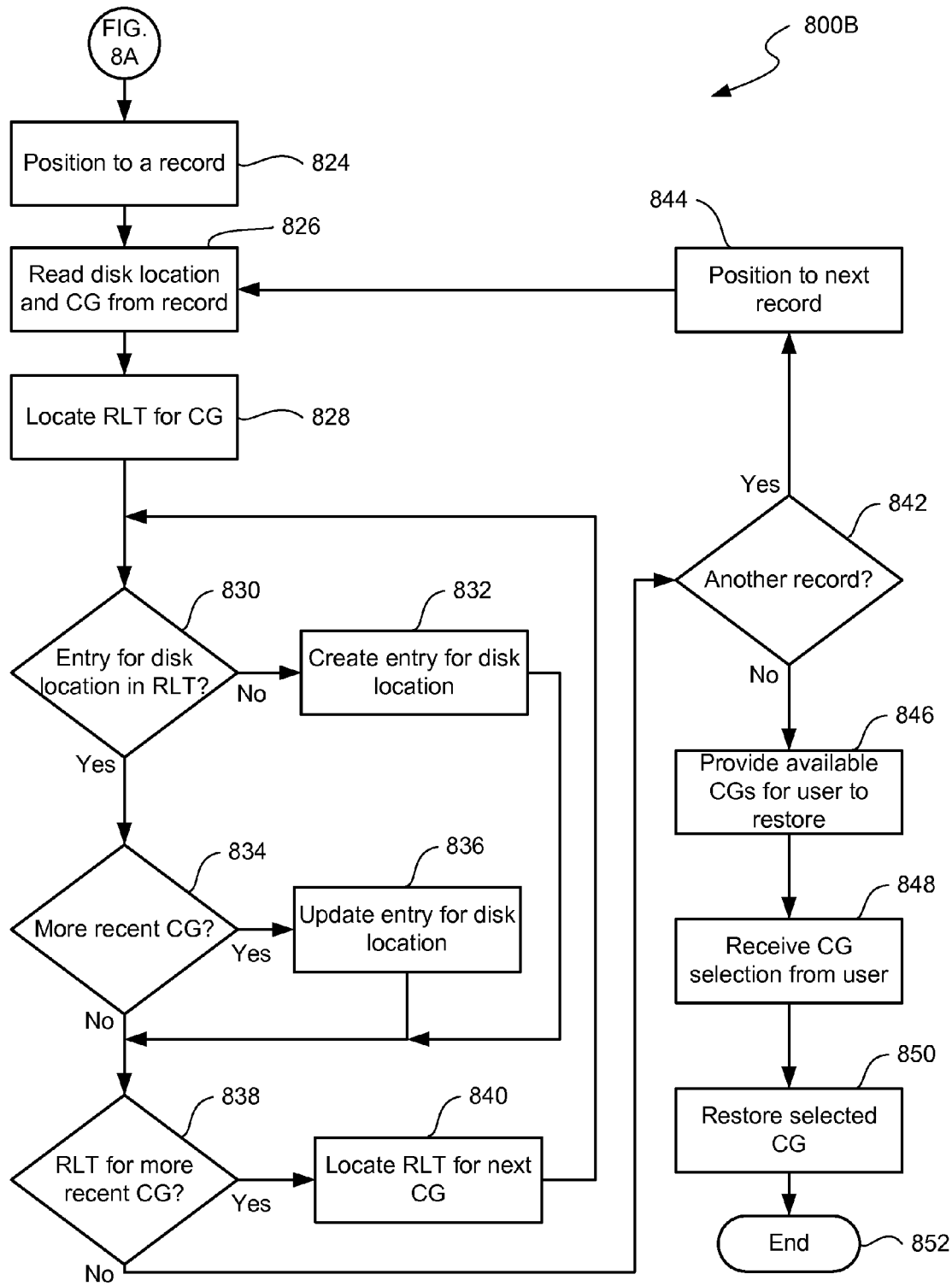
FIG. 8B depicts a second part of an example method for restoring data to disk storage from tape backup.

Referring to FIG. 8B, a second part 800B of the example method for restoring data to disk storage from tape backup is depicted. At block 824, a tape cartridge is positioned to a record. At block 826, the disk location and CG are read from the record. At block 828, the record location table for the CG is located.

At block 830, it is determined whether there is an entry in the record location table for the disk location. If there is no entry for the disk location, an entry is created for the disk location, at block 832, which includes the disk location, the record location, and the CG. If there is already an entry for the disk location in the track record table, at block 834 it is determined if the record has a CG which is more recent than the entry in the record location table. If the CG from the record is more recent, the entry is updated at block 836. Updating the entry includes changing the record location and the CG in the entry. At block 838, it is determined if there is a record location table for a more recent CG. If there is a record location table for a more recent CG, the record location table is located at block 840 and the method returns to block 830. If there are no more record location tables for a more recent CG, the method proceeds to block 842.

At block 842, it is determined whether there is another record. If there is another record, a tape cartridge is positioned to the next record, at block 844, and the method returns to block 826. If there is not another record, the method proceeds to block 846. At block 846, the CGs which are available to restore are provided to a user. CGs which are available to be restored may include CGs with record location tables which are complete and are not invalid. Further, it may include only CGs which are associated with a timestamp which may indicate that the CG was fully backed up to tape. The timestamps for the CGs may also be provided to the user to assist the user in determining a CG to select. At block 848, a selected CG is received from the user. At block 850, the CG is restored to disk storage from tape storage using the record location table associated with the CG. The method ends at block 852.

Referring to FIG. 9, an example record location table 900 created during the restore process is depicted. Record location table 900 contains the disk location (track ID), record location (tape cartridge and cartridge address), and consistency group for records associated with a given consistency group. As depicted, record location table 900 may be associated with consistency group 3 (or possibly a higher consistency group if the table is incomplete) as a record location table for a given consistency group may only have records written for the given consistency group and earlier consistency groups.

As depicted, assuming record location table 900 is complete for consistency group 3, track ID fb_0001 E has not been written to since consistency group 1; however, the record from consistency group 1 is still used for later record location tables until there is a consistency group where the disk location has been written to. This is because the data from consistency group 1 still represents the same data which is in later consistency groups before another write occurs at the location. Thus, a restoration of data from consistency group 3 would use the record created for consistency group 1 to restore data for track ID fb_0001E.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for asynchronous tape backup in a disk storage environment, the method comprising:
    maintaining a first metadata object, the first metadata object identifying a first set of disk locations which have been written to during a first consistency group; and
    writing backup data for the first consistency group, wherein the writing backup data for the first consistency group comprises:
        identifying a first disk location from the first set of disk locations;
        generating a first record comprising the first disk location, data stored at the first disk location, and a consistency group value identifying the first consistency group; and
        writing the first record to tape storage.

2. The method of claim 1, wherein the writing backup data for the first consistency group further comprises:
    identifying a second disk location from the first set of disk locations;
    generating a second record comprising the second disk location, data stored at the second disk location, and the consistency group value; and
    writing the second record to tape storage.

3. The method of claim 1, wherein the first record further comprises an invalid consistency group indicator, the invalid consistency group indicator identifying prior consistency groups which have become invalid.

4. The method of claim 1, wherein the first record further comprises a timestamp associated with the first consistency group.

5. The method of claim 1, wherein the first metadata object is a bitmap, the bitmap comprising a bit for each disk location being backed up to tape storage, each bit indicating whether a corresponding disk location is included in the first set of disk locations.

6. The method of claim 1, further comprising:
    maintaining a second metadata object during the writing backup data for the first consistency group, the second metadata object identifying a second set of disk locations which have been written to during a second consistency group.

7. A method for restoring data to disk storage from tape backup, the method comprising:
    scanning a set of tape cartridges, each tape cartridge containing records, each record comprising a disk location, a consistency group value, and backup data, the records comprising a first record at a first record location, the first record associated with a first disk location and a first consistency group value;
    generating a record location table for each consistency group value; and
    populating a first entry for the first record in a first record location table, the first record location table associated with the first consistency group value, the first entry comprising the first disk location, the first record location, and the first consistency group value.

8. The method of claim 7, further comprising:
    populating a second entry for the first record in a second record location table, the second record location table associated with a second consistency group value, the second consistency group value associated with a more recent consistency group than the first consistency group value, the second entry comprising the first disk location, the first record location, and the first consistency group value.

9. The method of claim 7, further comprising:
providing a set of consistency groups to a user, each consistency group in the set of consistency groups associated with a complete record location table;
receiving a selected consistency group from the user; and
restoring data to disk storage from the set of tape cartridges using a second record location table, the second record location table associated with the selected consistency group.

10. The method of claim 9, wherein one or more of the records further comprises a consistency group timestamp and wherein the providing the set of consistency groups the user further comprises providing one or more associated consistency group timestamps.

11. A system comprising:
a tape backup system comprising a set of tape cartridges; and
a disk storage system connected to the tape backup system, the disk storage system configured to:
maintain a first metadata object, the first metadata object identifying a first set of disk locations which have been written to during a first consistency group; and
write backup data for the first consistency group, wherein writing backup data for the first consistency group comprises:
identifying a first disk location from the first set of disk locations;
generating a first record comprising the first disk location, data stored at the first disk location, and a first consistency group value identifying the first consistency group; and
writing the first record to tape storage.

12. The system of claim 11, wherein the writing backup data for the first consistency group further comprises:
identifying a second disk location from the first set of disk locations;
generating a second record comprising the second disk location, data stored at the second disk location, and the first consistency group value; and
writing the second record to tape storage.

13. The system of claim 11, wherein the first record further comprises an invalid consistency group indicator, the invalid consistency group indicator identifying prior consistency groups which have become invalid.

14. The system of claim 11, wherein the first record further comprises a timestamp associated with the first consistency group.

15. The system of claim 11, wherein the first metadata object is a bitmap, the bitmap comprising a bit for each disk location being backed up to tape storage, each bit indicating whether a corresponding disk location is included in the first set of disk locations.

16. The system of claim 11, wherein the disk storage system is further configured to:
maintain a second metadata object during the writing backup data for the first consistency group, the second metadata object identifying a second set of disk locations which have been written to during a second consistency group.

17. The system of claim 11, wherein the disk storage system is further configured to:
scan the set of tape cartridges, the set of tape cartridges containing a set of records, each record in the set of records comprising a disk location, a consistency group value, and backup data, the set of records comprising a second record at a first record location, the first record associated with a second disk location and a second consistency group value;
generate a record location table for each consistency group value; and
populate a first entry for the second record in a first record location table, the first record location table associated with the second consistency group value, the first entry comprising the second disk location, the first record location, and the second consistency group value.

18. The system of claim 17, wherein the disk storage system is further configured to:
populate a second entry for the second record in a second record location table, the second record location table associated with a third consistency group value, the third consistency group value associated with a more recent consistency group than the second consistency group value, the second entry comprising the second disk location, the first record location, and the second consistency group value.

19. The system of claim 17, wherein the disk storage system is further configured to:
provide a set of consistency groups to a user, each consistency group in the set of consistency groups associated with a complete record location table;
receive a selected consistency group from the user; and
restore data to disk storage from the set of tape cartridges using a second record location table, the second record location table associated with the selected consistency group.

20. The system of claim 19, wherein one or more of the records in the set of records further comprises a consistency group timestamp and wherein the providing the set of consistency groups the user further comprises providing one or more associated consistency group timestamps.

* * * * *